United States Patent [19]

Riblet et al.

[11] Patent Number: 5,092,907
[45] Date of Patent: Mar. 3, 1992

[54] LIQUID COLORANT DISPERSION

[75] Inventors: Jean-Jacques Riblet, Viuz en Sallaz; Gilles Catherin, Annemasse, both of France

[73] Assignee: Sicpa Holding S.A., Glarus, Switzerland

[21] Appl. No.: 482,973

[22] Filed: Feb. 22, 1990

[30] Foreign Application Priority Data

Mar. 30, 1989 [CH] Switzerland ............ 01157/89

[51] Int. Cl.$^5$ .................. C09C 3/00; C09B 67/00
[52] U.S. Cl. ............................. 8/645; 8/922; 8/926; 8/580; 8/617; 428/36.6; 106/32; 106/22
[58] Field of Search ............ 106/32, 22, 186; 8/922, 8/926, 670, 617, 580; 428/36.6, 437

[56] References Cited

U.S. PATENT DOCUMENTS 3,802,952 4/1974 Gurin et al. .................. 428/337
4,360,606 11/1982 Tobias et al. ................ 106/186

FOREIGN PATENT DOCUMENTS 1013104 6/1961 Switzerland .
966850 11/1959 United Kingdom .
1520751 8/1978 United Kingdom .

OTHER PUBLICATIONS

Liq. Colouring Agent for Polyester Comprises Plant Oil & Pigments, Toyo Ink MFG KK #62-167349.

*Primary Examiner*—William R. Dixon, Jr.
*Assistant Examiner*—Timothy Saunders
*Attorney, Agent, or Firm*—Young & Thompson

[57] ABSTRACT

The liquid colorant dispersion intended to be incorporated in plastic materials prior to their transformation and intended to color in bulk these plastic materials comprises a vehicle principally comprising a terpene oil based on pinene and colorant materials. An ethoxylated alkylphenol and other surface-active constituents selected from the group comprising sodium dioctylsulfosuccinate, sodium benzoate, fatty acid condensates, phosphoric ester and alkylpolyalkoxylate may be added to the vehicle. This dispersion compatible with conventional polymers permits obtaining products of a homogeneous coloration, without surface alteration and without distortions.

9 Claims, No Drawings

LIQUID COLORANT DISPERSION

The present invention has as an object a liquid colorant dispersion intended to be incorporated in plastic materials prior to their transformation and intended to color in bulk these plastic materials, the dispersion comprising at least one colorant material contained in a vehicle.

Four different principal types of in-bulk coloration of plastic materials are known:

a) direct coloration of the polymer at the time of its synthesis, b) coloration by master mixture having a very elevated concentration of coloration or pigment, c) coloration by addition of a powder containing the colorant or pigment as a granulate, and d) coloration by liquid colorant dispersion.

The present invention concerns the last type of coloration in which a liquid or pasty colorant dispersion is mixed with the granulated plastic material prior to its transformation, for example in an extruder or injection press.

Most known dispersions use plasticizers, particularly adipates and/or phthalates, which, as a function of the amount of incorporation in the plastic material, significantly modify the characteristics of the polymer.

There are also known dispersions containing sorbitan esters as surface-active agents, such as described in French patents Nos. 2,262,089 and 2,265,835. These dispersions may, in certain cases, give rise to warping in the injected articles, difficulties of operating, screw spinning, deposits of liquid colorants on the screws and the molds, and require an agitation prior to use to counteract sedimentation.

The object of the present invention is to improve characteristics of known dispersions by permitting:

a) improving the dimensional stability of the injected article, reducing or eliminating the phenomena of retraction and warping, b) preventing significant modification of the characteristics of the polymer to be colored, c) reducing to a minimum the absorption of humidity and thus preventing an alteration of the surface aspect by crystallizing the hygroscopic plastic materials, d) increasing the pigmentary concentration of the liquid dispersion without modifying the rheological properties, improving the coloring capacity of the liquid dispersion, thus permitting using very small amounts of liquid dispersion for coloring polymers, which is very advantageous from the point of view of economy and technique by reason of a decreased alteration of the mechanical properties of the polymers, and e) incorporating anti-static additives in the dispersion without affecting the transformation parameters of the polymer, such as screw spinning, f) preserving its homogeneity with the liquid colorant at the time of storage, g) preventing colorant stagnation on the equipment and permitting a rapid cleaning of the machine at the time of changing color.

To obtain the above-mentioned objectives, the dispersion according to the invention is characterized in that the vehicle comprises an oil based on hydrocarbons of the terpene series. This oil is advantageously constituted of a dimer of $\alpha$-pinene.

According to a preferred embodiment of the invention, the vehicle contains an alkylphenol as surface-active agent permitting a very homogeneous dispersion without altering the surface appearance of the colored element.

According to variations of the invention, the dispersion may comprise in addition at least one surface-active agent selected from the group comprising sodium dioctylsulfosuccinate, sodium benzoate, fatty acid condensates, phosphoric esters and alkylpolyalkoxylates.

Other advantages will be apparent from the characteristics expressed in the dependent claims and in the description given hereinafter of particular embodiments of the invention.

The liquid colorant dispersions used to color plastic materials in bulk comprise a vehicle to which are added the colorant materials. The weight ratio of colorant material to the weight of the vehicle is comprised between 0.1 and 5, according to the nature of the colorant materials and the polymer to be colored, and according to the desired intensity of coloration. For mineral pigments, this ratio is favorably situated between 1.5 and 4, whereas in the case of soluble colorants, this ratio takes on smaller values, for example 0.2.

The principal component of the vehicle is a terpene oil based on pinene, referred to hereinafter as terpene oil. The weight of the vehicle in terpene oil varies between 20 and 90%, preferably between 50 and 80%.

According to a preferred embodiment, there is used a terpene oil constituted by a $C_{20}H_{32}$ dimer of $\alpha$-pinene of the formula

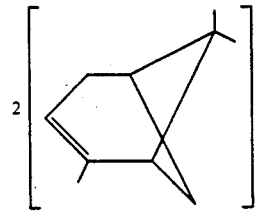

This dimer oil of $\alpha$-pinene is especially well adapted for use as a vehicle and has the following characteristics:

| | | |
|---|---|---|
| Density at 20° C. | 0.93–0.95 | (according to Standard ASTM D40) |
| Viscosity at 20° C. (Haake) | 4 to 6 poise | (according to Standard ASTM D44) |
| Gardner color | 4 to 5 | (according to Standard NFT 20.0) |
| Index of refraction | 1.5 to 1.52 | (according to Standard ASTM D12) |
| Iodine value | 130 to 140 | (according to Standard ASTM D151) |
| Acid number | None | (according to Standard ASTM D150) |
| Saponification index | None | (according to Standard ASTM D1462) |

This component is sold under the mark "DERPHARLIN" by the company DRT (64, rue de Miromesnil, F-75008 Paris). Use of this terpene derivative permits obtaining a high degree of homogeneity of the dispersion and of the coloration obtained in the polymer. It is no longer necessary to incorporate plasticizers in the dispersion which significantly modify the characteristics of the polymer. The absorption of humidity is very slight, which allows preventing alterations of the surface aspect by crystallization of the hygroscopic plastic materials. In addition, the vehicle based on terpene derivatives permits very greatly reducing or eliminating the phenomena of retraction and warping of the elements obtained by injection, especially when these latter are large in size and the polymer is of the polyethylene or polypropylene type.

According to preferred embodiments of the invention, an alkylphenol is added to the vehicle in proportions varying between 5 and 35% by weight of the vehicle. There is preferably used an ethoxylated alkylphenol, such as ethoxylated nonyl phenol of the formula

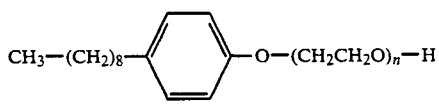

in which n varies from 2 to 14, but is preferably about 6. This ethoxylated alkylphenol has the following characteristics:

| Density at 20° C. | 1.04 | (according to Standard ASTM D4052) |
| --- | --- | --- |
| Viscosity at 25° C. | 3.6 poise | (according to Standard ASTM D445) |
| Hazen coloration (max) | 150 | (according to Standard NFT 20605) |
| Solidification point | 17° C. | (according to Standard NFT 20-051) |
| Flash point | 243° C. | (according to Standard ASTM D56) |
| HLB | 11.3 | (according to the ATLAS method) |
| Wetting capacity | 20° C. 0.9 g/l | (according to Standard NFT 73,406) |
| Cloud temperature | 69 ± 3 | (according to Standard ISO R1065) |

This ethoxylated alkylphenol possesses excellent dispersant wetting properties in the terpene oil-based vehicle. It may also be purchased under the trade name "CEMULSOL ES" of the company S.F.O.S. (15, bd de l'Amiral Bruix, F-75116 Paris). By this addition, the pigmentary concentration of the liquid dispersion may be increased without modifying its rheological properties and the coloring capacity may be increased. These two points permit using very small amounts of liquid dispersion for coloring polymers, varying between 0.5 and 1%. The cost of coloration is thus low. The risk of altering the mechanical properties of the obtained polymer is reduced, and there is also provided a greater compatibility with different polymers.

According to the nature of the colorant materials employed, the surface-active properties of the vehicle and thus of the dispersion are specifically adapted by adding constituents selected from the group comprising sodium dioctylsulfosuccinate, sodium benzoate, fatty acid condensates, condensate of fatty acid derived from quaternary ammonium, phosphoric ester and alkylpolyalkoxylate.

The sodium dioctylsulfosuccinate of the formula

and the sodium benzoate of formula $Na(C_6H_5COO)$ are added to the dispersion in maximum amounts of 5% and 1%, respectively. Preferably, these wetting-dispersants are used in a mixture containing 85% sodium dioctylsulfosuccinate and 15% sodium benzoate and having the following characteristics:

| Granulometry | 15-150 microns | |
| --- | --- | --- |
| Iodine value | 2.5 max | (according to Standard ASTM D151) |
| Acid number | 0.25 max | (according to Standard ASTM D150) |
| Density | 1.1 | (according to Standard ASTM D4052) |

This mixture is sold under the mark "AEROSOL OTB" by the company Devineau (42, rue du Paradis, F-75010 Paris).

The condensate of fatty acid and the condensate of fatty acid derived from quaternary ammonium are added in maximum amounts of 5% and 2%, respectively, to the dispersion. These two constituents are hyperdispersants, viscosity stabilizers, and permit advantageously increasing the pigmentary concentration of the liquid colorant, the coloring capacity and reducing the viscosity.

There is advantageously used a condensate of fatty acid having a density of 0.91 and a viscosity (20° C., 1000 sec$^{-1}$) of 3.8 Pa.s and a condensate of fatty acid derived from quaternary ammonium having a density of 0.93 and a viscosity of 20.3 Pa.s. These substances are sold under the trade name "SOLSPERSE 3000 and 17000" by the company ICI (1, av. Newton, F-92142 Clamart).

These "SOLSPERSE" hyperdispersants have an original chemical structure especially conceived for their use in plasticizer dispersions. They are constituted of two parts, each separately performing an essential function:

an adhesion group which is strongly adsorbed on the surface of solid products (pigment, etc.) and a polymeric chain having a strong affinity for certain organic liquids so as to obtain a maximum stabilization of the dispersion.

The phosphoric ester is added in a maximum amount of 1% and plays the role of viscosity reducer and wetting agent. There is preferably used a dispersant based on potassium salt of a phosphoric ester of a density of 1.1-1.5 and a pH of 7.5±0.5. This constituent is sold under the trade name "PHOSPHAC D6NK" by the company Protex (6, rue Barbes, F-92305 Levallois).

The alkylpolyalkoxylate of the formula $R-COO-(CH_2CH_2O)_xH$ is used up to maximum values of 20% of the dispersion. This constituent has dispersant and non-ionic anti-static properties. Its density is about 1 and its pH is about 6.5±0.5. It is sold under the trade name "NOPCO SPERSE 188 A" by the company Henkel-Nopco (P.O. Box 4, F-77981 Levallois).

These liquid colorant dispersions are obtained by mixing the vehicle described above with either mineral pigments in a maximum amount of 80%, or organic pigments in a maximum amount of 25%, or also with soluble colorants at a maximum concentration of 30%.

The selected liquid colorant dispersions are measured, for example with a peristaltic electronic pump and added in amounts varying between 0.5 and 3% to the plastic materials to be transformed, such as polyethylenes, polypropylenes, polycarbonates, polymethacrylates, polyvinyls, polystyrenes, polyurethanes, fluorinated polymers, polyester, etc. The liquid colorant dispersions are capable of being used for all the transformation modes by injection and extrusion. The resultant polymers have a homogeneous distribution of the colorant materials and other additives in the plastic material without occurrence of retraction or deformation. Thanks to the particular vehicle of the dispersion based on terpene oil, this latter is perfectly compatible with conventional polymers, having a low utilization rate on the order of 0.5 to 1% as a general rule and delivering optimum color yield.

The following examples illustrate particular applications.

EXAMPLE 1

Orange pigmentary dispersion usable for coloring hygroscopic resins such as polycarbonates and polymethacrylates:

| | |
|---|---|
| solvent orange 60 | 15% |
| α-pinene dimer terpene oil | 60.2% |
| ethoxylated alkylphenol | 24.8% |
| | 100% |

This dispersion permits a homogeneity of tint without altering the surface aspect by crystallization.

EXAMPLE 2

Brown pigmentary dispersion usable for coloring high density polyethylene:

| | |
|---|---|
| iron oxide pigments | 62.3% |
| α-pinene dimer terpene oil | 27.8% |
| ethoxylated alkylphenol | 5.5% |
| sodium dioctylsulfosuccinate | 3.6% |
| phosphoric ester | 0.8% |
| | 100% |

Used at 0.5%, this dispersion permits, for example, obtaining bottle racks without any distortion or warping.

EXAMPLE 3

Green pigmentary dispersion usable for coloring high density polyethylene:

| | |
|---|---|
| phthalocyanine pigment | 6.1% |
| titanium dioxide | 31.7% |
| muscovite | 15.9% |
| α-pinene dimer terpene oil | 27.9% |
| alkylphenol | 5.3% |
| sodium benzoate | 0.2% |
| sodium dioctylsulfosuccinate | 0.9% |
| fatty acid condensate | 0.4% |
| fatty acid condensate derived from quaternary ammonium | 0.4% |
| alkylpolyalkoxylate | 11.2% |
| | 100% |

This composition used at 0.5% permits obtaining, for example, cosmetic covers having an excellent dimensional stability and this in the presence of phthalocyanine pigment in the formulation, which pigment usually causes the phenomena of retraction and distortion in high density polyethylene.

EXAMPLE 4

White pigmentary dispersion usable for coloring high density polyethylene:

| | |
|---|---|
| titanium dioxide | 71.4% |
| α-pinene dimer terpene oil | 11.7% |
| ethoxylated alkylphenol | 4.8% |
| fatty acid condensate | 0.7% |
| alkylpolyalkoxylate | 11.4% |
| | 100% |

Used in an amount of 1.25%, this dispersion permits obtaining bottles by blowing extrusion without screw spinning in the presence of non-ionic anti-static agent.

EXAMPLE 5

Beige pigmentary dispersion for coloring low density linear polyethylene:

| | |
|---|---|
| cadmium pigment | 14.6% |
| titanium dioxide | 30.2% |
| iron oxide | 0.8% |
| carbon black | 0.2% |
| α-pinene dimer terpene oil | 12% |
| ethoxylated alkylphenol | 4.6% |
| sodium benzoate | 0.78% |
| sodium dioctylsulfosuccinate | 4.2% |
| fatty acid condensate | 0.6% |
| fatty acid condensate derivative of quaternary ammonium | 0.02% |
| alkylpolyalkoxylate | 32% |
| | 100% |

Used in an amount of 1% in a highly fluid polyethylene, this dispersion permits the manufacture of very thin covers injected at a high rate without screw spinning and in a homogeneous manner.

EXAMPLE 6

Brown pigmentary dispersion usable for coloring polypropylene:

| | |
|---|---|
| iron oxide pigments | 28.5% |
| chrome yellow | 21.4% |
| titanium dioxide | 10% |
| carbon black | 0.09% |
| α-pinene dimer terpene oil | 16.4% |
| ethoxylated alkylphenol | 6.6% |
| sodium benzoate | 0.3% |
| sodium dioctylsulfosuccinate | 1.5% |
| fatty acid condensate | 1% |
| fatty acid condensate derivative of quaternary ammonium | 0.01% |
| alkylpolyalkoxylate | 14.2% |
| | 100% |

Used in an amount of 3%, this dispersion permits, for example, the manufacture of flower pots of slight thickness without altering the mechanical properties and without screw spinning at the time of injection.

EXAMPLE 7

Blue pigmentary dispersion usable for coloring radical and linear low density polyethylene film:

| | |
|---|---|
| phthalocyanine pigment | 8.7% |
| ultramarine pigment | 7.3% |
| titanium dioxide | 49.9% |
| α-pinene dimer terpene oil | 23.2% |
| ethoxylated alkylphenol | 9.5% |
| fatty acid condensate | 1.4% |
| | 100% |

Used in an amount of 2.75%, this dispersion permits manufacturing a film having a thickness of 30 microns, uniformly colored without modification of the extrusion parameters.

EXAMPLE 8

Gray pigmentary dispersion usable for coloring a rigid PVC tube in extrusion:

| | |
|---|---|
| carbon black | 8.4% |
| titanium dioxide | 41.8% |
| α-pinene dimer terpene oil | 49.8% |
| | 100% |

Used in an amount of 0.4%, this dispersion permits maintaining the mechanical characteristics of the extruded tube.

It is evident that the examples and embodiments described above do not have any limiting character in that they may receive any desirable modifications within the scope of the invention as defined by the claims. In particular, there could be used an oil based on hydrocarbons of the terpene series other than a dimer of α-pinene, such as monocyclic terpenes such as terpineol, bicyclics such as bornene, or oligomers of these terpenes. There could also be added additives intended to provide complementary effects such as thermal protection, stabilization with respect to ultra-violet radiation, anti-static effects, fireproofing agents, fungicides, odorant agents. There could also be used a charge composed of platelet minerals such as potassium and/or sodium micas, muscovites, paragonites, kaolinite, or also needle minerals such as sodium zeolites (natrolite) to obtain special visual effects. Other minerals such as potassium and/or sodium feldspars, aluminum silicates, corundum, spinells, phosphates, especially apatite, could also serve as charge additives in the dispersion.

We claim:

1. Liquid colorant dispersion intended to be incorporated in plastic materials prior to their transformation and intended to color in bulk these plastic materials, the dispersion comprising at least one colorant material contained in a vehicle, characterized in that the vehicle comprises an oil based on hydrocarbons of the terpene series, said oil comprising a dimer of α-pinene.

2. Dispersion according to claim 1, characterized in that the vehicle contains an alkylphenol.

3. Dispersion according to claim 2, characterized in that the said alkylphenol is an ethoxylated alkylphenol of the formula

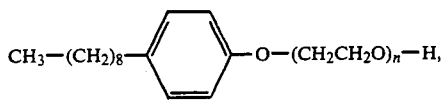

wherein N varies between 2 and 14.

4. Dispersion according to claim 1, characterized in that it comprises at least one surface active agent selected from the group comprising sodium dioctylsulfosuccinate, sodium benzoate, fatty acid condensates, phosphoric esters and alkylpolyalkoxylates.

5. Dispersion according to claim 1, characterized in that the vehicle comprises a charge selected from the group consisting of substances comprising potassium and/or sodium micas, kaolinite, potassium and/or sodium feldspars, aluminum silicates, corundum, spinells, phosphates, particularly apatite, sodium zeolites.

6. Dispersion according to claim 1, characterized by a weight ratio of colorant materials/vehicle weight comprised between 0.1 and 5.

7. Dispersion according to claim 1, characterized in that the vehicle comprises between 20 and 90% of the said oil.

8. Dispersion according to claim 4, characterized in that the vehicle comprises between 5 and 35% alkylphenol.

9. Method of producing tinted plastic materials, comprising adding from about 0.5 to about 3% by weight of a liquid colorant dispersion to a plastic material to be transformed, said liquid colorant dispersion comprising at least one colorant material contained in a vehicle, the vehicle comprising an oil which is a dimer of α-pinene.

* * * * *